(12) United States Patent
Campiglio et al.

(10) Patent No.: US 12,265,437 B2
(45) Date of Patent: Apr. 1, 2025

(54) NETWORK CONNECTED DEVICE ENERGY CONSERVATION

(71) Applicant: Cisco Technology, Inc., San Jose, CA (US)

(72) Inventors: Ugo M. Campiglio, Morges (CH); Jerome Henry, Pittsboro, NC (US); Sachin D. Wakudkar, St-Sulpice (CH); Juan Carlos Zuniga, Montreal (CA); Domenico Ficara, Essertines-sur-Yverdon (CH)

(73) Assignee: Cisco Technology, Inc., San Jose, CA (US)

( * ) Notice: Subject to any disclaimer, the term of this patent is extended or adjusted under 35 U.S.C. 154(b) by 85 days.

(21) Appl. No.: 18/172,993

(22) Filed: Feb. 22, 2023

(65) Prior Publication Data

US 2024/0012461 A1   Jan. 11, 2024

Related U.S. Application Data

(60) Provisional application No. 63/367,937, filed on Jul. 8, 2022.

(51) Int. Cl.
*G06F 1/3206*  (2019.01)
*G06F 1/3209*  (2019.01)
*G06F 1/3231*  (2019.01)

(52) U.S. Cl.
CPC .......... *G06F 1/3206* (2013.01); *G06F 1/3209* (2013.01); *G06F 1/3231* (2013.01)

(58) Field of Classification Search
CPC ..... G06F 1/3209; G06F 1/3206; G06F 1/3231
See application file for complete search history.

(56) References Cited

U.S. PATENT DOCUMENTS

| 2009/0300383 A1 | 12/2009 | Kaneko |
| 2016/0095061 A1 | 3/2016 | Vainapel et al. |

(Continued)

FOREIGN PATENT DOCUMENTS

EP   3786763 A1   3/2021

OTHER PUBLICATIONS

International Search Report and Written Opinion for International Application No. PCT/US2023/069540, mailed Oct. 25, 2023, 13 Pages.

(Continued)

*Primary Examiner* — Glenn A. Auve
(74) *Attorney, Agent, or Firm* — Patterson + Sheridan, LLP

(57) ABSTRACT

Enhanced network level information for power control is described. The enhanced network level information enables network connected electronic devices to enter and exit standby modes based on system level information. The network level information also enables the use of a respective network connected device in a seamless manner from the perspective of the user, while decreasing the amount of energy consumed by the device when not in active operation. In some examples, a Network Monitoring Application (NMA) classifies electronic devices into power control categories, monitors a physical environment associated with the plurality of connected electronic devices, and provides a power control signal to the various electronic devices upon detection of a change in the physical environment.

20 Claims, 8 Drawing Sheets

(56) References Cited

U.S. PATENT DOCUMENTS

| | | | |
|---|---|---|---|
| 2016/0095062 A1* | 3/2016 | Rabii | H04W 52/0235 |
| | | | 370/311 |
| 2016/0139647 A1* | 5/2016 | Choi | G06F 1/3231 |
| | | | 713/320 |
| 2018/0176860 A1 | 6/2018 | Triano et al. | |
| 2018/0262578 A1 | 9/2018 | Shaw et al. | |
| 2018/0270754 A1 | 9/2018 | Snyder et al. | |
| 2018/0288567 A1 | 10/2018 | Maloney et al. | |
| 2018/0356871 A1* | 12/2018 | Gutierrez-Vazquez | |
| | | | G06F 1/3228 |
| 2020/0195804 A1* | 6/2020 | Saeda | H04N 1/344 |
| 2021/0029298 A1* | 1/2021 | Mysore | H04N 23/66 |
| 2021/0373833 A1* | 12/2021 | Pawar | G09G 3/3406 |
| 2022/0043501 A1 | 2/2022 | Mukherjee et al. | |
| 2023/0033044 A1* | 2/2023 | Vegesna | G01S 5/0205 |
| 2023/0359261 A1* | 11/2023 | Fukushi | G06F 3/1204 |

OTHER PUBLICATIONS

Latlit K. Mestha et al., "Control of Color Imaging Systems: Analysis and Design," CRC Press, Year: 2017, pp. 584-597.

\* cited by examiner

NETWORK CONNECTED DEVICE ENERGY CONSERVATION

CROSS-REFERENCE TO RELATED APPLICATIONS

This application claims benefit of U.S. provisional patent application Ser. No. 63/367,937 filed Jul. 8, 2022. The aforementioned related patent application is herein incorporated by reference in its entirety.

TECHNICAL FIELD

Embodiments presented in this disclosure generally relate to improving energy and power conservation for electronic devices connected to a communication network. More specifically, embodiments disclosed herein include a network monitoring application in the communication network which monitors the network and related environmental factors to provide enhanced network level insight and energy saving instructions to the connected electronic devices.

BACKGROUND

As technology develops, electronic devices are increasingly deployed throughout personal, commercial, and enterprise settings. While these electronic devices are often designed to limit energy/power consumption on an individual/device level, as the number and type of these electronic devices are deployed the amount of electrical power needed to keep these electronic devices in an operational state increases. For example, while an individual electronic device may consume a small amount of power during a steady or active state (e.g., not in standby and not in a full operational mode), an enterprise wide deployment of the electronic devices cumulates the small amount of power consumption into a large energy expenditure across the deployment. While developments in power conservation have reduced the amount of power used by individual devices, coordinating power conservation across a network remains a challenge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
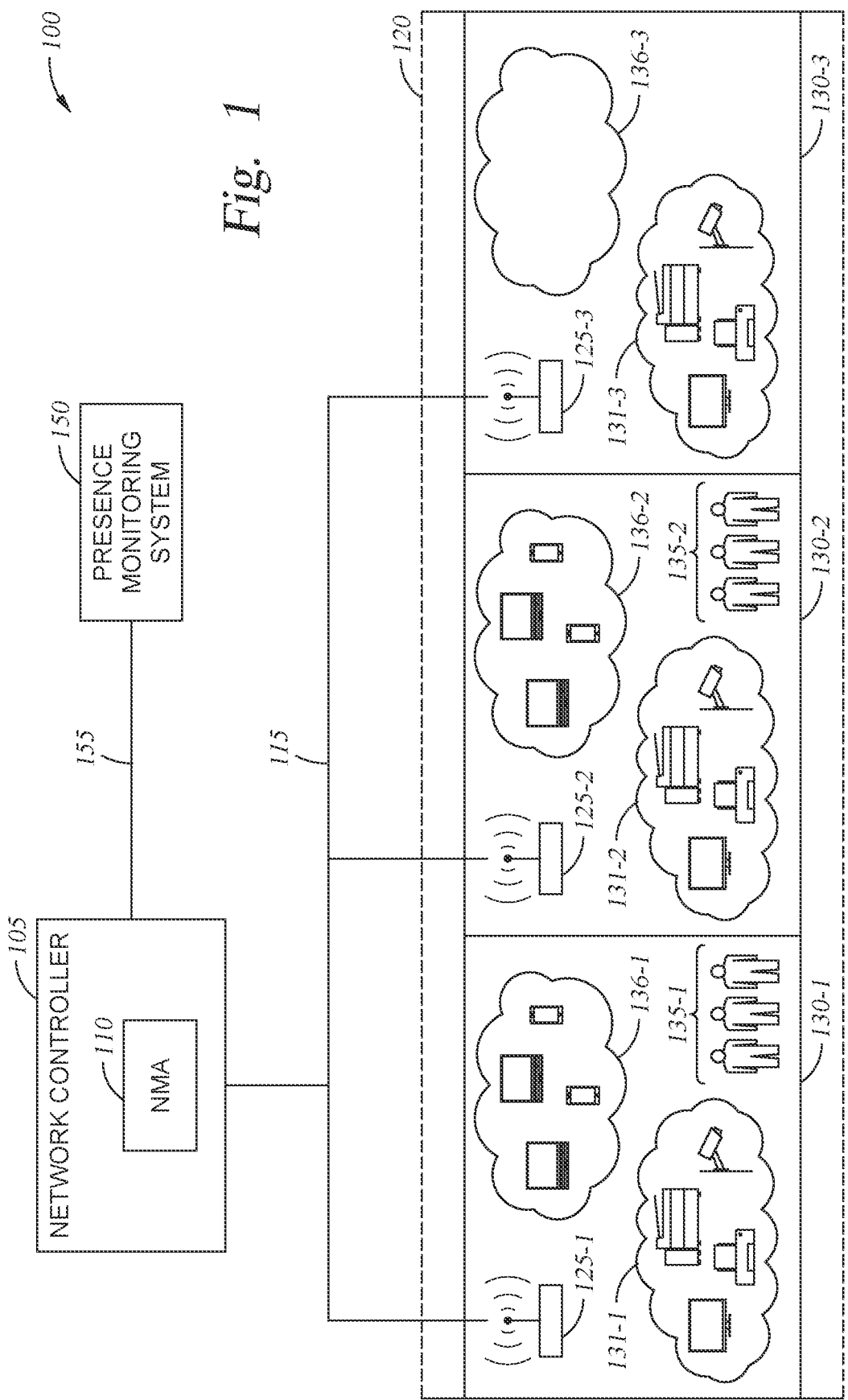
FIG. 1 illustrates a schematic diagram of an example networked system, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method. The method may include classifying, at a network monitoring application (NMA), a first electronic device of a plurality of connected electronic devices into a first power control category of a plurality of power control categories, monitoring a physical environment associated with the plurality of connected electronic devices based on environmental factors in the first power control category, detecting a power control change in the physical environment, and transmitting a power control signal to the first electronic device Other embodiments of this aspect include corresponding computer systems, apparatus, and computer programs recorded on one or more computer storage devices, each configured to perform the actions of the methods.

One general aspect includes a system. The system may include a processor; and a memory comprising instructions which, when executed on the processor, performs an operation. The operation may include: classifying, at a network monitoring application (NMA), a first electronic device of a plurality of connected electronic devices into a first power control category of a plurality of power control categories, monitoring a physical environment associated with the plurality of connected electronic devices based on environmental factors in the first power control category, detecting a power control change in the physical environment, and transmitting a power control signal to the first electronic device.

One general aspect includes a computer program product. The computer program product includes a computer program product, the computer program product may include a non-transitory computer-readable medium program having program instructions embodied therewith, the program instructions executable by a processor to perform an operation. The operation may include: classifying, at a network monitoring application (NMA), a first electronic device of a plurality of connected electronic devices into a first power control category of a plurality of power control categories, monitoring a physical environment associated with the plurality of connected electronic devices based on environmental factors in the first power control category, detecting a power control change in the physical environment, and transmitting a power control signal to the first electronic device.

EXAMPLE EMBODIMENTS

As technology advances, an increasing number of objects and devices are developed into "smart devices" which provide advanced functions such as network connectivity. For example, Internet of Things (IoT) devices incorporate devices that were previously not connected to a network into networked systems (e.g., smart thermostats, smart light bulbs, appliances, office devices, etc.). Additionally, people increasingly use network connected electronic devices for personal, business, and other uses. This includes personal devices such as mobile phones, laptops, tablets, etc. and more general use devices such as kiosk systems, televisions, monitors, etc. Each of the above mentioned devices often includes advanced features provided via onboard electronics (e.g., integrated circuits, etc.) and network connectivity via wireless communication (e.g., via Wi-Fi, Bluetooth, and other wireless communication protocols).

The addition of onboard electronics, radios, and other electronic components in these network connected devices in turn increases a baseline energy consumption of the devices in a steady state or active state. For example, a network connected device may use a baseline level of electricity to maintain network connectivity and operational ability. While some advances have been made to limit the amount of electricity and energy consumed by these network connected devices, both consumers and regulators desire less energy consumption across all electronic devices. As described above, this desire become even more pronounced across large enterprises where limiting energy consumption relates to both a desire to reduce costs of consumed electricity and reduce environmental impacts of the enterprise as a whole.

As described above, some methods exist to reduce a power consumption of electronic devices, including increased efficiencies in the components making up the device. For example, modern appliances, user devices, etc. often use less power during operation than previous iterations of the respective technology. However, most devices achieve a maximum power efficiency during a standby mode. For example, a device in a standby mode often uses only a small percentage of the power that the device uses during non-standby modes or in active operation. In order to provide increased energy savings, it is most beneficial for devices to enter a standby mode when appropriate. However, a device entering a standby mode too often may result increased energy consumption due to reboot procedures from the standby mode to a ready to operate mode.

For example, individual devices may have preinstalled power modes such an active power/operation mode, sleep mode, and deep sleep mode (or standby mode). In the active power mode, most or all of the key components of the network connected device are powered. In the sleep mode, the network connected device limits power or powers down various components that can be repowered and operational in a short period of time. The remaining components such as electronic components that may take a longer time to "wake up" to operational state, and those required to process, compute and react to human or network action detection remain powered and operational in the sleep mode. In the deep sleep or standby mode, the network connected device powers down any component/process that may be powered down. The standby mode provides the greatest power savings, but also requires a longer reboot time for the device to become operational out of the standby mode (as compared to the sleep mode).

In some examples, the devices make standby and sleep mode decisions based on timers. For example, after a first inactivity time the device may enter the sleep mode and then enter the standby mode after a second inactivity time. While the timer based mechanisms provide some level of power savings, some devices may not be optimized for use in certain deployments. For example, a printer/copier station in an office environment may operate on a timer based power management mode. However, the printer/copier station repeatedly entering a standby mode can be costly for the efficiency of the device operations. For example, in a printer or copier, the process of warming up a fuser (i.e. a component that bonds toner powder to paper) may take several minutes thus most printer/copier stations avoid entering a standby mode too often, which increases a baseline operating energy usages of the printer/copier and decreases the operational efficiency of the device.

Additionally, a network connected printer may consume approximately 300 watts (W) in an active mode (i.e., ready to print) and 675 W for 15 seconds when printing a sheet in an operational mode. In contrast, the printer consumes 20 W when in standby mode. The process for waking the printer from standby to active mode increases consumption to 680 watts for 4 to 6 minutes while the printer readies the various components for the operational mode. In this example, the printer switching to standby mode saves 280 watt-hours (Wh), with an additional cost of 7 Wh to return the system to the active or operation mode. In order to reduce the energy usages of the printer a default standby timeout may set by a printer operator to 30 minutes. During any given time of day, the timeout mechanism may be effective in providing reduce power consumption without causing operational delays or wakeup energy expenditures.

However, in some contexts the timer based mechanism may cause unneeded energy consumption by staying in an active mode or sleep mode, when the device enters a standby mode. For example, when a last person has exited an office environment at the end of workday, a printer/copier station may directly enter a standby mode from a potential user perspective (i.e., the printer will not be used for a longer period of time). In the time based mechanisms, the printer station potentially stays in the active mode for 30 minutes at 300 W consumption instead of the 20 W of the standby mode. While seemingly minor, this timer based active mode represents a daily increased consumption of 0.14 kWh, which in turn results in approximate $0.84 in energy cost per month (where a kWh price is $0.20). For large enterprises, such as an office complex with many printer stations distributed throughout the office complex, this extra cost can present a large amount of wasted electricity and large energy expenditure. For example, a campus with 31 buildings with 4 floors in each building and 2 printers per floor means that the timer based cost is approximately $208 a month or $2500 a year. Additionally, this extra cost and energy usage is increased even more by the large variety of network connected devices throughout modern home, office, and other spaces.

In order to address the limitations of the timer based and other limited power management mechanisms at the devices, the systems and methods described herein provide enhanced network level information for power control, which enables network connected electronic devices to enter and exit standby modes based on system level information. The network level information enables the use of a respective network connected device in a seamless manner from the perspective of the user, while decreasing the amount of energy consumed by the device when not in active operation. In some examples, a Network Monitoring Application (NMA), described herein, classifies electronic devices into power control categories, monitors a physical environment associated with the plurality of connected electronic devices, and provides a power control signal to the various electronic devices upon detection of a change in the physical environment as described in more detail in relation to FIGS. 1-6.

FIG. 1 illustrates a schematic diagram of an example networked system 100, according to one embodiment. In some examples, the system 100 is an enterprise system, which covers a large scale deployment of a network and network connected devices (e.g., an office building, corporate campus, etc.). The system 100 may also function as a smaller scale network (e.g., in a home or small business, etc.). The system 100 includes a network controller 105, for a network 115. The network controller 105 also includes an NMA 110. The NMA 110 provides network connected device classification, network and environment monitoring, and optimized power management for the connect devices as described herein.

For the purposed of illustration, the network 115 and the various connected network components are described herein as a Wi-Fi network; however, the network 115 may be any type of wireless or wired communication network (e.g., Bluetooth, Ethernet, etc.). The physical area 120 provides network level control and traffic routing for the various connected electronic devices in a physical area 120. The physical area 120 may include any physical space where electronic devices are able to communicatively connect to the network 115. In some examples, the network 115 is a Wi-Fi network such as a wireless local area network (WLAN) and includes access points (APs) 125-1-125-3 (collectively referred to as APs 125) distributed through the physical area 120. The APs 125 provide wired or wireless access to electronic devices to connect to the network 115.

For example, the physical area 120 includes APs 125-1, 125-2, and 125-3 distributed throughout the physical area 120. For example, the AP 125-1 is associated with a first zone 130-1 of the physical area 120, the AP 125-2 is associated with a second zone 130-2, and the AP 125-3 is associated with a third zone 130-3 (where the zones 130-1-130-3 are collectivity referred to as zones 130). In some examples, the zones 130 are subareas of the physical area 120 defined by various physical or other defining attributes. For example, each respective zone of the zones 130 may include a floor in a multi-story building, a building in a multi-building campus, or other physical division in the physical area 120. The individual zones of the zones 130 may also be defined by a coverage area of APs in the respective zone. For example, the zone 130-1 may be defined by an effective radio coverage area of the AP 125-1. In some examples, the physical area 120 defines the zones 130 and separates and defines which connected devices, APs, etc. belong to which respective zone of the zones 130.

Each of the respective zones 130 include a number of network connected electronic devices, including stationary and mobile devices. For example, stationary devices 131-1 are located in the first zone 130-1, stationary devices 131-2 are located in the second zone 130-2, and stationary devices 131-3 are located in the third zone 130-3. The stationary devices 131-1-131-3 (collectively stationary devices 131) may include any type of electronic device connected to the network 115 and the physical area 120 which typically remains in the respective zone or area. For example, the stationary devices 131-1 typically remain in the zone 130-1. The stationary devices may include any device which is typically non-moving, including desktop computers, printers, copiers, cameras, internet of things (IoT) devices (e.g., thermostats, light bulbs, etc.) or other network connected electronic devices that typically do not leave the respective zone. While described above in relation to a printer/copier station, any of the stationary devices 131 may include similar active, sleep, and standby modes which are enhanced by the environmental and power control signals generated by the NMA 110 as described herein.

In some examples, the NMA 110 detects environmental conditions, including presence information, of relevant physical areas, such as the physical area 120, and provides environmental/presence information and control to the connected network devices. For example, the NMA 110 may provide information about time of day (working hours or idle hours) for the physical area 120, ambient temperature, machine activity, user/human presence, light activation, etc. Then NMA 110 also uses this environmental information to enable system level informed decisions for connected devices to enter and exit standby modes. This system level decision making maximizes powers savings while also providing quick access to an active or operational state of a connected device when a user needs to interact with or use the device.

In some examples, the stationary devices 131 may include devices which are designed to be mobile (e.g. a tablet computer, etc.), but the physical area 120 detects that the device remains in the respective zone (e.g., a tablet computer functioning as a dedicated interface (kiosk) in the physical area 120). The stationary devices 131 may also include various presence sensing or other environmental feedback devices which provide environmental information to the physical area 120 and the NMA 110 as described herein.

In some examples, the respective zones 130 also include a number of network connected mobile devices including mobile devices 136-1 and 136-2. The mobile devices may include network connected devices that may enter and leave a respective zone at different times. For example, users 135-1 in the zone 130-1 may have associated electronic devices including laptops, tablet devices, mobile phones, wearable devices, etc. included in the mobile devices 136-1 and connected to the network 115 via the AP 125-1 or the AP 125-2. In some examples, the mobile devices 136-1 may not directly connect to the network 115, but may be detected by the physical area 120 via various radios in a respective AP. For example, a mobile device in the mobile devices 136-1 may not connect to the AP 125-1 for network connection, but may be detected by various device detection methods at the AP 125-1 and network controller 105.

In some examples, a zone or area may not have any mobile devices located in the zone. For example, no mobile devices are located in the third zone 130-3 at a time shown in FIG. 1. The NMA 110 uses the presence of mobile devices in a zone or the lack of mobile devices in a zone to determine various power control states such as whether users (e.g., the users 135-1 and 135-2) are present in the physical area 120.

In some examples, the NMA 110 may also receive presence information from a presence monitoring system 150 via a network 155. In an enterprise setting, the presence monitoring system 150 may provide campus wide information concerning potential user presence. For example, a user that typically works in the zone 130-1 may enter or exit via a common door using an identifiable credentials (e.g., enters via a door swipe system). While the NMA 110 may not immediately detect the user has entered or left the zone 130-1 via the mobile devices 136-1 or other presence sensing devices in the stationary devices 131-1, the presence monitoring system 150 alerts the NMA 110 that the user is likely to be present in the zone 130-1 or has left the zone 130-1. The NMA 110 alerts the stationary devices 131-1 of the presence change via a power control signal as described in more detail herein. In order to determine which devices are stationary or mobile the NMA 110 may provide power control signals to, the NMA 110 classifies the devices as shown in FIGS. 2A and B.

Figure 2A:
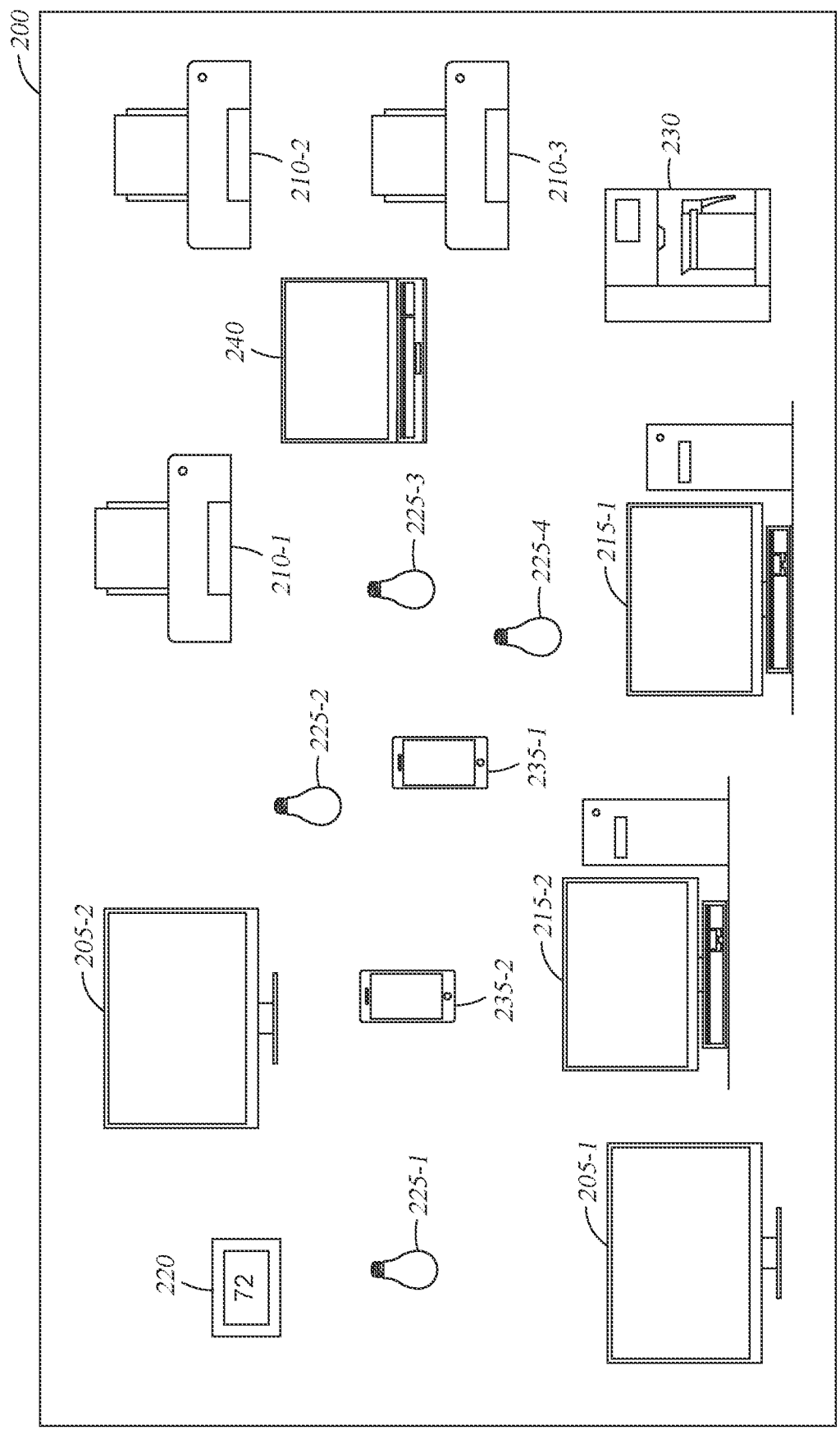
FIGS. 2A and 2B illustrate a classification of devices in a physical area, according to one embodiment.
Figure 2B:
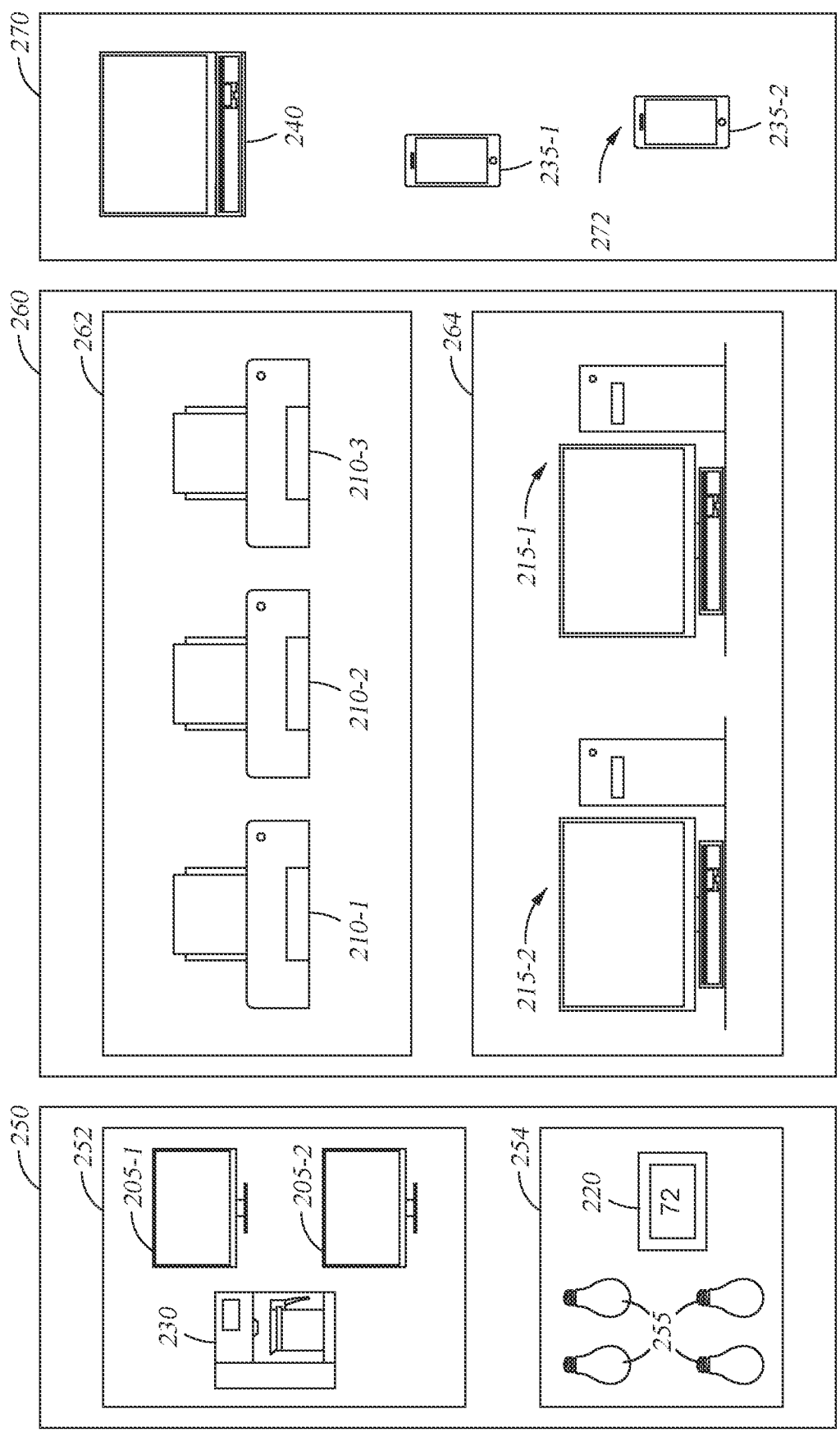

FIGS. 2A and 2B illustrate a classification of devices in a physical area, according to one embodiment. In some examples, the NMA 110 classifies, over time, each network connected device (e.g., Wi-Fi client) into a one or more categories, including at least stationary devices and mobile devices. For example, as shown in FIG. 2A, a physical area 200 includes a number of network connected devices including monitors 205-1 and 205-2, thermostat 220, printers 210-1, 210-2, and 210-3, smart lightbulbs 225-1-225-4 (collectively smart lightbulbs 225), coffee maker 230, mobile devices 235-1-235-2, and laptop computer 240. Each of the devices shown in physical area 200 is connected to the NMA 110 shown in FIG. 1 or is detected as present in the physical area 200 by the NMA 110 (e.g., via detection at AP not shown in FIG. 2A).

In some examples, the classification of the connected devices occurs when the respective device is detected or connects to the network 115 via the physical area 120. For example, the printer 210-1, while establishing a connection to the network 115, indicates any power saving features available at the printer 210-1 and what type of power control signals may be received from the NMA 110. For example, the printer 210-1 may use an autonomous power saving mechanism and only receive environmental information (e.g., presence information) from the NMA 110. In this example, the printer 210-1 uses the environmental information for the entire physical area 200 to make standby mode decisions (e.g., enter or exit a standby or deep sleep mode).

In another example, the classification of the device occurs over time as the NMA determines usage and other power information. For example, the NMA 110 determines various usage patterns for the smart lightbulbs 225, including when the bulbs are powered on, powered off, or otherwise changed. In some examples, the NMA determines which devices do not have an autonomous power saving mechanism, or which devices to override a local autonomous power saving mechanism with a central decision making mechanism. In both cases, the NMA 110 controls when the device enters/exits a standby mode as described in more detail in relation to FIG. 5.

As described above in relation to FIG. 1, a stationary device is a device or client that is at a static or nearly static position when connected to the network 115. In some examples, these devices are determined by the NMA 110 to rarely or never leave the physical area 200 and may include desktop computer stations, IP phones, printers, televisions/monitors, security cameras, IoT devices, etc. Additionally, a stationary device may be static-stationary (e.g. a printer that never moves) or nomadic-stationary (e.g. a tablet computer used for presenting, that may be moved from one presenting monitor to another, and thus within a zone or from one zone to another, but never leaves the physical area 200). In another example, a mobile device is a device that periodically enters and leaves the zone or area, such as user devices (e.g., mobile phones, laptops, and other personal devices).

In some examples, the NMA 110 identifies stationary devices through the stability of their signal on the floor plan of the area (e.g. always using the same set of APs when associated with the network 115, RSSI within the mean stochasticity of the zone or area, or a small set of APs if the device is nomadic-stationary).

In the example shown in FIG. 2B, the NMA 110 classifies the devices in the physical area 200 into various classifications and sub-classifications. For example, classification 250 includes centralized decision devices, where the NMA 110 provides power control of the devices using power control profiles. In the centralized decision mode, the NMA 110 classifies the connected devices into categories (e.g. printers, lights, cameras, coffee machines, etc.). In some example, a different control profile can be associated to each category or sub-classification 252 and 254. In some examples, the control profile contains information about the factors to be considered by the NMA 110 to decide whether the devices of each category should be active or in stand-by mode. For example, the control profile for sub-classification 262 may indicate that the monitors 205-1-205-2 should enter standby mode when no user is present in the office, between 7 p.m. and 7 a.m., or after 6 PM if all lights in the office are off. In another example, the control profile for the thermostat 220 includes a control instruction to enter standby mode between 7 p.m. and 4 a.m. unless presence is detected in the building or the temperature reaches a threshold value.

In an autonomous decision mode, the NMA 110 may receive alarms and triggers from sensors and other devices. (e.g. light sensors, movement, temperature, opening or closing doors, timers, etc.) The NMA 110 also receives or calculates presence information. The presence information may be organized by areas or by zones, and is performed either directly with Wi-Fi device movement and detection, coupled with a probabilistic method such as Bayesian inference, or relies on APIs to non-Wi-Fi devices (e.g. cameras or presence detection systems) as described in more detail in relation to FIG. 3.

For example, sub-classification 252 includes the coffee maker 230 and monitors 205-1 and 205-2 which may operate under a same power control profile. The NMA 110 may cause the devices in the sub-classification 252 to enter a standby mode when no user presence is detected in the physical area 200 at the end of a workday or when the NMA otherwise determines the devices will not be used.

Sub-classification 254 includes smart lightbulbs 225 and thermostat 220 which may operate under a same power control profile. For example, the NMA 110 may cause the devices in the sub-classification 254 to exit a standby mode in non-typical hours when the lightbulbs or thermostat are needed, such as during a security patrol performed by security officer. In this example, the devices in the sub-classification 254 are likely to be used by a user during the short time, but the devices in the sub-classification 252 are not likely to be used. While shown with two sub-classifications in FIG. 2B, the NMA 110 may generate a control profile for each individual connected device based on device usage and environmental information collected by the NMA 110.

The NMA 110 also classifies devices into the classification 260 with sub-classifications 262 and 264. In some examples, classification 260 includes autonomous decision devices, where the NMA 110 provides a set of environmental factors to the devices for autonomous local power control. In some examples, the sub-classifications 262 and 264 may use different sets of environmental factors. For example, the printers 210-1-210-3 in the sub-classification 262 may use a different set of presence and other environmental information than the desktop computers 215-1-215-2 in the sub-classification 264 for local power control decisions.

The NMA 110 also identities and classifies mobile device in classification 270. In some examples, the mobile devices may also be grouped in a sub-classification 272, where the devices in the sub-classification may indicate a different type of user presences than the other mobile devices. For example, the device 235-2 may belong to a security office or other work that passes through the physical area 200 only temporality such that only some of the devices (e.g., smart lightbulbs 225) may need to alter their standby states while others may continue in a current standby state. As described above, presence detection and other monitored environmental factors may be received and monitored from a variety of sources as shown in more detail in FIG. 3.

Figure 3:
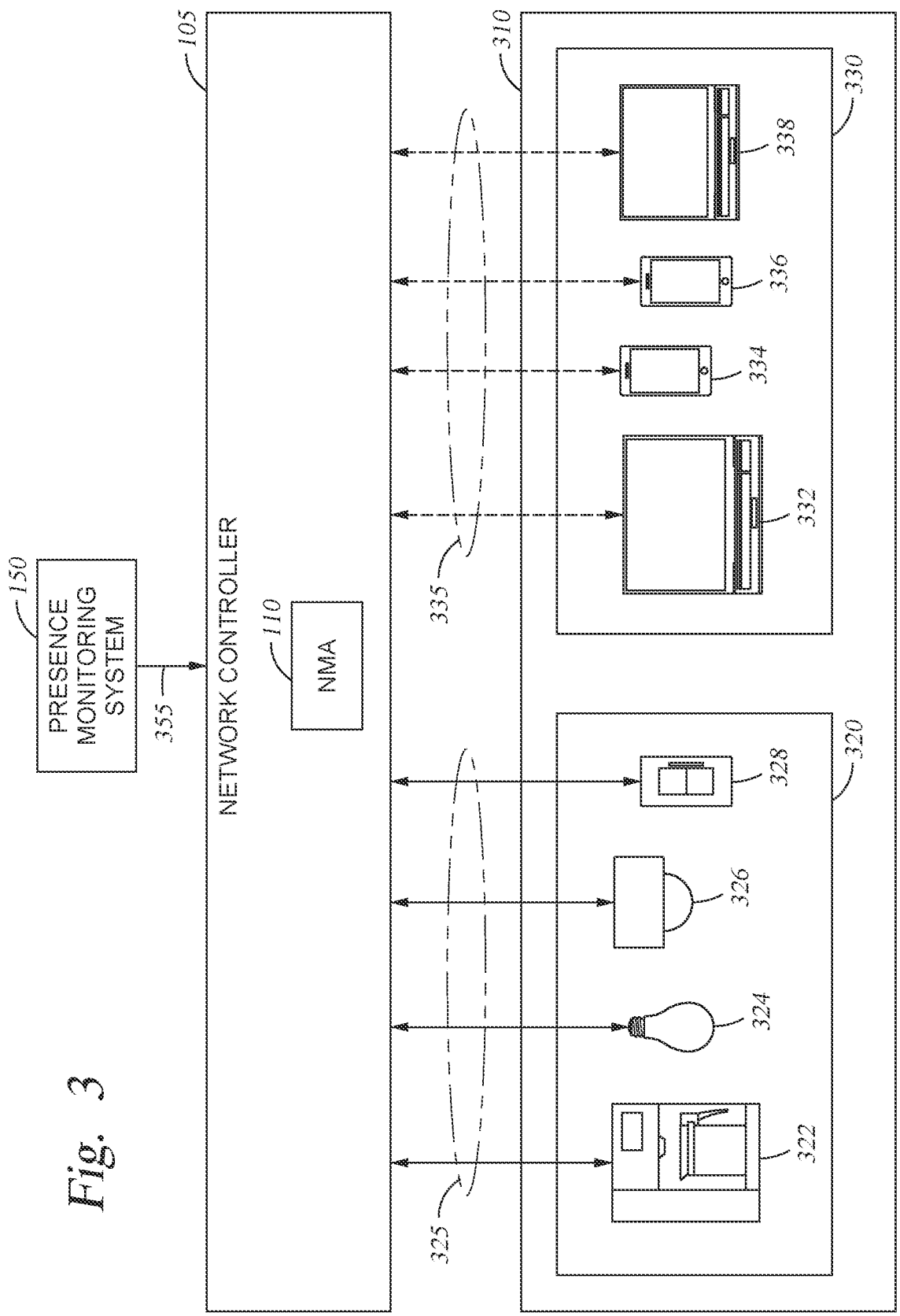
FIG. 3 illustrates environmental monitoring in a networked system, according to one embodiment.

FIG. 3 illustrates environmental monitoring in a networked system, according to one embodiment. As described above in relation to FIGS. 1, 2A and 2B, the NMA 110 may use presence information and environmental factors received from different sources to generate power control signals for the various devices in the system 100.

In some examples, the NMA 110 detects physical conditions including user presence using stationary devices 320, mobile devices 330, a dedicated presence monitoring system 150, or a combination of any of the devices. For example, FIG. 3 includes a zone 310 with the stationary devices 320 and mobile devices 330, which may be similar to any of the zones 130-1-130-3 (e.g., a floor in a multi-story building or other defined physical space). In some examples, the zone 310 includes various connected network devices classified as stationary device 320. The stationary devices 320 may include a coffee maker 322, a smart lightbulb 324, a motion detector 326, and a light switch 328. The zone 310 also includes various connected network devices classified as mobile devices 330. The mobile devices 330 may include a laptops 332 and 338 and smart phones 334 and 336 (among other example devices described in relation to FIGS. 1 and 2A-2B).

The mobile devices 330 enter and leave the zone 310, and can move from one zone to another, then leave the zone or area. In some examples, the NMA 110 records individual device behavior in a time series. For example, the NMA 110 detects and records that smart phone 334 typically roams last to an AP in a zone associated with an exit, and then stops sending traffic without sending a disassociation frame. The NMA 110 may also detect and record that the smart phone 336 typically sends a disassociation message to an AP near a different zone such as near an elevator to underground parking in an office space, etc. . . . .

The NMA 110 uses the mobile device and other tracking data to maintain a count of mobile devices that are connected to the network at a given time. The NMA 110 may also associate the different mobile devices to their owner, via the username used for authenticating into the network. The NMA 110 may also use this information to estimate a number of users present in the zone 310 instead of the number of mobile devices. In some examples, the NMA 110 detects when a user has left the premises, even in the case the user leaves behind a personal mobile device. For example, when a user is authenticated on a laptop and a mobile phone, the NMA 110 detects that both devices entered the zone and were associated to the network. In an example, where the NMA 110 detects the phone has left the zone 310, the NMA determines that the user has also left the zone 310 even if the laptop is still detected (and not moving).

In some examples, the NMA 110 also monitors the network activity of each device to determine if the device is being currently used by a user or is idle. In some examples, the NMA 110 compares traffic volume and type over time (e.g., a device in dozing mode >90% of the time in a given interval) to detect network activity. In some examples, a mobile device in idle mode is not used to indicate the presence of its owner until it is reactivated. In an example where the zone 310 is a home environment, the NMA 110 may detect only a subset of registered devices (e.g., mobile phones of users) to indicate the presence as some personal devices are likely to be left behind by users when exiting the zone.

In some examples, to increase the reliability in distinguishing between active and idle mobile devices for presences detection, the NMA 110 may install an application on connected mobile devices during the onboarding procedure. The application, in turn, monitors user activity on the device (screen on/off, last I/O input time, user logged or not on the device) and provides the presence information 335 to the NMA 110. While the NMA 110 monitors traffic of each device and the presence of different devices belonging to each user, the additional feedback from the installed application enhances detection in outlier examples (forgotten personal device, borrowed device by another user, etc.).

In some examples, the NMA 110 differentiates between two types of detected presence. For example, a first type is identification of mobile devices and stationary devices that are active in a given zone such as zone 310. In this example, human or user presence is inferred from the activity of the devices above.

In some examples, devices in a physical area (e.g., zone 310), including network connected stationary devices 320 and mobile devices 330, may also provide environmental and presence information 325 and 335 for the physical area. For example, motion detector 326 and other security devices may provide any collected information to the NMA 110. Additionally, coffee maker 322, smart lightbulb 324 and light switch 328 may also provide information to the NMA 110. For example, when any of the devices are manually switched on, the device indicates the status change to the NMA 110 which updates presence information and control profiles for the stationary devices 320.

For example, at a time t the NMA 110 detects the stationary devices for the zone 310 are idle and a last mobile device of the mobile devices 330 leaves the zone 310. In this example, the probability that no human or user is present is high (and higher at time t+1 than at time t, if the above conditions persist). In another example, the NMA 110 detects a mobile device in the zone 310. When the device is active, then the probability of human presence is higher than the example above. If the device is idle, then the probability of human presence is lower.

In both examples, the NMA 110 generates power control signals in order to reduce the power consumption at the scale of the zone (e.g., floor/building/campus), with the awareness that exceptions can occasionally occur in some zones. A local or zone based false positive may cause some devices to enter standby mode (thus, if the energy consumption of the individual zone is overall lower, this particular zone did not contribute to energy savings during the false positive time). A false negative contributes to power saving, but at the cost of a wait time for the user of a particular device. In general, the NMA 110 reduces the consumed power of the zone 310 and physical area 120 in FIG. 1, with the awareness that local exception may occasionally occur, without significant consequence for the overall power conservation of the physical area 120.

In some examples, the NMA 110 also uses additional methods to detect human/user presence. For example, the presence monitoring system 150 provides presence information 355. In some examples, the presence information 355 includes identification of users and others that may enter a physical area (e.g., zone 310, zones 130 of physical area 120 in FIG. 1 and physical area 200 in FIG. 2A). The NMA 110 generates and updates control profiles for the network connected devices using the presence information 355.

For example, in premises where users badge to enter and exit the premises, the badge reader communicates presence information 355 to the NMA 110 indicating the arrival or departure of each user. In premises where badges are not present, cameras or motion detectors at the entrance detect user entrances and departures and communicate the information it to the NMA 110, which uses the information to generate and update power control signals for the connected devices.

Figure 4A:
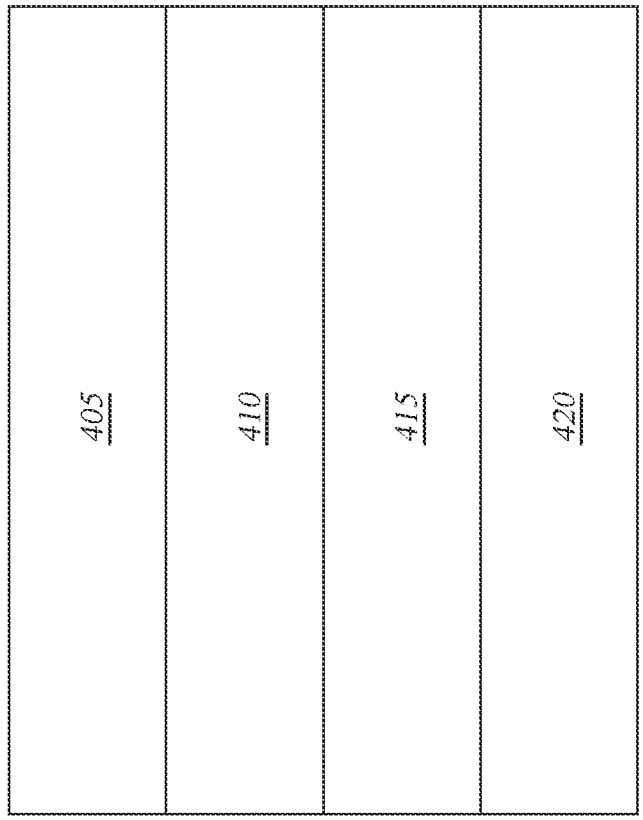
FIGS. 4A and 4B illustrate power control signals, according to embodiments.
Figure 4B:
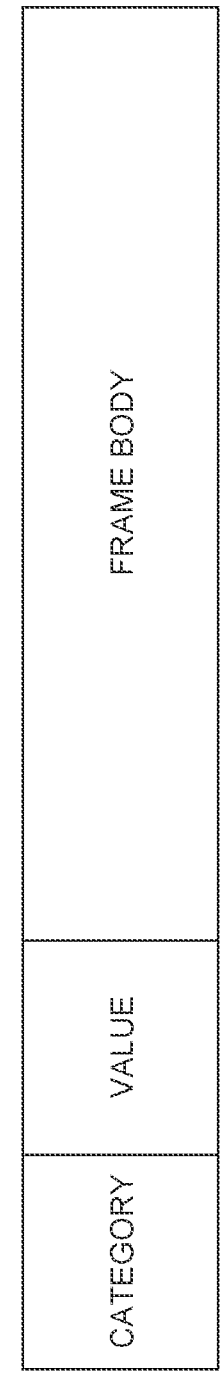

FIGS. 4A and 4B illustrate power control signals, according to embodiments. FIGS. 4A and 4B illustrate power control signals, according to embodiments. In some examples, the NMA 110 uses a frame 400 shown in FIG. 4A, a frame 450 shown in FIG. 4B, or a combination of communication signals to provide the power control signals to the connected devices.

In one example, the NMA 110, using an autonomous decision mode, shares the set of environmental and presence information in beacon frames, such as the frame 400, which allows the power control signal to reach all connected devices at a low signal cost. In some examples, devices in standby modes maintain basic network connectivity, and detect an IE in a Delivery Traffic Indication Map (DTIM)—bearing beacon, such as the frame 400. The devices then trigger a state change (e.g. from standby to active mode) based on the information in the frame 400.

In some examples, the IE contains environmental and presence information detected at the NMA 110. The frame 400 may also include an estimated number of active users with the estimated probability for the information to be accurate; alarms that have been triggered in the last minute (e.g. presence detected, door unlocked, coffee machined turned on etc.); lights status (on/off/unavailable); doors status (open/closed/unavailable); status for other connected devices; building operations status, etc. The environmental and presence information may also include whether ambient temperature is higher/lower than or matching a target temperature and whether a current time is working time/idle time for a respective zone.

In one embodiment, the environmental and presence information is formatted inside the frame 400 in a TLV format. In this example, a numeric identifier represent each information type such as each element 405-420 includes a specified type of information across the various frame transmissions and devices. In some examples, the elements 405-420 are adapted to a given environment (e.g. the NMA 110 may only share light status and working time is for a specific zone, while providing additional information for a different area or zone).

In some examples, the frame 400 can be seen/received by all devices in a given zone (including the ones that are connected to the network). However, the information in the frame may only be translated by those devices connected to the NMA 110 with a TLV mapping installed on the device. In some examples, the devices may request the TLV mapping during association or connection processes.

In another embodiment, the information in the frame 400 may be generalized as "power-saving levels," from the lowest to the highest, matching the activity in the area, and which devices can then interpret accordingly. For instance, some devices would only be used when power-saving is "above level 2" (e.g. representing 'lights are on'), where other devices are only powered when the signal is above "level 5" (e.g., representing 'multiple user presence'). In a similar embodiment, power-saving levels in the frame 400 may be generalized as "profiles", allowing devices to be in power-save when the "profile A" is advertised, and turning on when "profile C" is advertised. Additionally, the frame 400 may also contain information on whether there has been a change since last DTIM and a link accessible on the network to retrieve all the available information.

In another example, the NMA 110 instructs APs to send unicast action frames, such as frame 450 to devices to let them know about a significant transition or to send an assertive instruction in the centralized decision mode) to enter or exit stand-by. The frame 450 allows targeted information to be transmitted instead of cell-wide advertisement above of the frame 400. In some examples, the frame 450 may be shared periodically (e.g., autonomous decision mode) or when there is a significant transaction (e.g., number of users reaches a threshold, time alarm expired, movement detected, etc.). Additional details on the generation and transmission of the power control signals is described in more detail in relation to FIG. 5.

Figure 5:
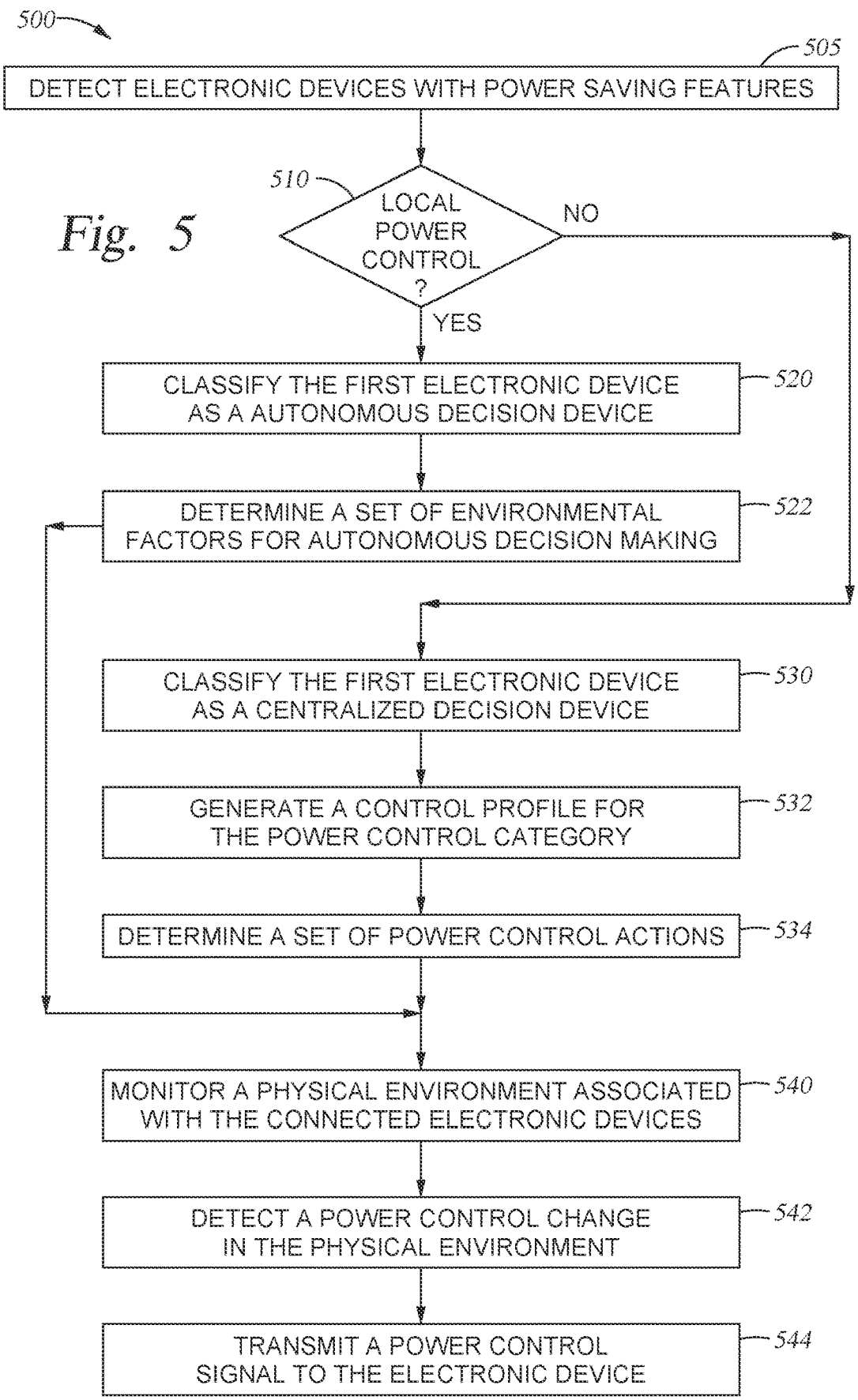
FIG. 5 is a flow chart outlining general operations for generating a power control signal, according to one embodiment.

FIG. 5 is a flow chart outlining general operations for generating a power control signal, according to one embodiment. Method 500 begins at block 505, where the NMA 110 detects connected electronic devices with power saving features. For example, as shown in FIG. 1, the NMA 110 detects any of the stationary devices 131-1, 131-2, and 131-3 are connected to the network 115. In some examples, various devices advertise power saving features to the physical area 120 and the NMA 110 when connecting to network 115. For example, connected devices may exchange various power saving functions and mechanisms during a communication sequence with the physical area 120 while establishing the device connection to the network 115. In some examples, the connected devices may indicate whether the device is enabled with local power control or uses central decision making.

At block 510, the NMA 110 detects a local power control capability for an electronic device. For example, during a network connection process, the device indicates to the NMA 110 whether the device is able to use environmental information to for autonomous decisions or whether the device relies on the NMA 110 for power control.

In an example, where the device has local/autonomous power control, the method 500 proceeds to block 520 where the NMA 110 classifies the first electronic device as an autonomous decision device and determines, from the local power control, a set of environmental factors for autonomous decision making at the first electronic device at block 522.

In an example, where the device does not have local power control or the NMA 110 determines the local power control should be overridden, the method 500 proceeds to block 530 where the NMA 110 classifies the first electronic device as centralized decision device and generates a control profile for a first power control category at block 532. In some examples, the control profile includes a set of environmental factors for central power control. In some example, the NMA 110 may also associate additional power control categories of a plurality of power control categories to the first power control category. For example, any of the sub-classifications in FIGS. 2A and B may associated with multiple power control categories.

At block 534, the NMA 110 determines a set of power control actions which includes at least a wake action to wake a device from a standby mode and a conserve or standby action for the electronic device to enter a standby mode. At block 540, the NMA 110 monitors a physical environment associated with the plurality of connected electronic devices.

In some examples, monitoring the physical environment includes monitoring the set of environmental factors for autonomous decision making or the factors for the power control actions. Monitoring environmental and presence factors is described in more detail in relation to method 600 of FIG. 6.

At block 542, the NMA 110 detects a power control change in the physical environment. In some examples, upon detecting a power control change in the physical environment, the NMA 110 selects an action from the set of power control actions for any centralized decision devices.

At block 544, the NMA 110 transmits a power control signal to the first electronic device including at least an indication of the detected power control change. In some examples, the power control signal includes current values for the set of environmental factors for autonomous decision devices. The power control signal may also include in the selected action for centralized control devices. In some examples, the power control signal includes an information element (IE) in a Delivery Traffic Indication Map (DTIM) beacon with a tag-length-value (TLV) array, where the NMA 110 sets each value in the TLV array based on the physical environment and the detected power control change as described in FIG. 4A. Additionally, the power control signal may include a unicast action frame as shown in FIG. 4B where the NMA 110 transmits subsequent power control signals according to a transmission schedule, in order to provide up to date environmental and presence information to the connected devices.

Figure 6:
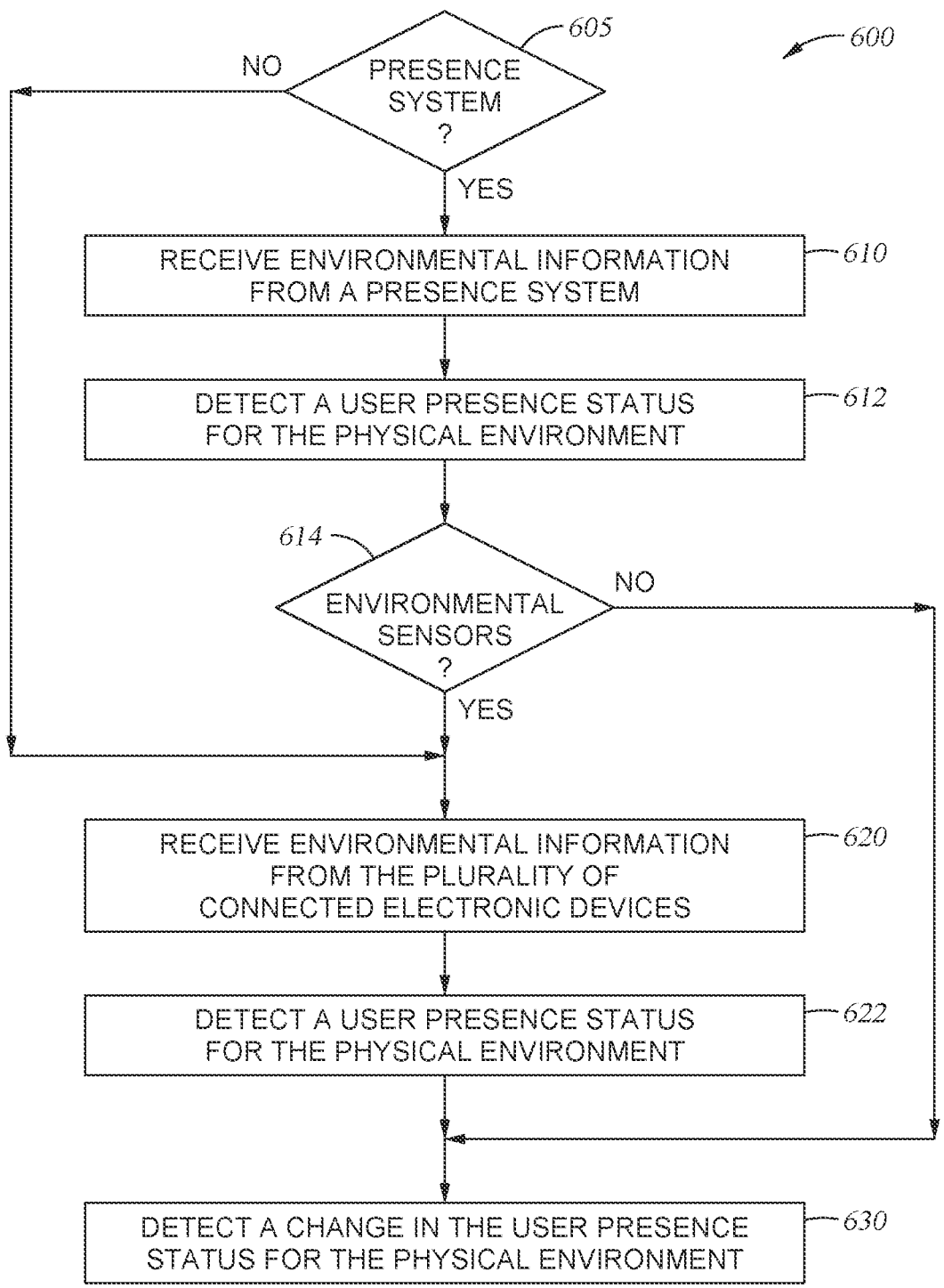
FIG. 6 is a flow chart outlining general operations for detecting user presence, according to one embodiment.

FIG. 6 is a flow chart outlining general operations for detecting user presence, according to one embodiment. Method 600 begins at block 605, where the NMA 110 determines whether an external presence system is providing information to the NMA 110. For example, the NMA 110 determines whether the presence monitoring system 150 connected to the NMA 110 and providing presence or other information. When a presence system is connected to the NMA 110 method 600 proceeds to block 610. When a presence system is not connected to the NMA 110 method 600 proceeds directly to block 620.

At block 610, the NMA 110 receives environmental information from the presence system (e.g., the presence monitoring system 150) and detects from the received environmental information a user presence status for the physical environment at block 612. At block 614, the NMA 110 determines whether environmental sensor or other devices in the network 115 are providing information to the NMA 110. When the NMA 110 is receiving environmental and presence information from connected devices, method 600 proceeds to block 620; otherwise method 600 proceeds directly to block 630.

At block 620, the NMA 110 receives environmental information from the plurality of connected electronic devices and detects, from the received environmental information, a user presence status for the physical environment at block 622. At block 630, the NMA 110 detects a change in the user presence status for the physical environment based on the information received from the presence system and/or from the user presence status for the physical environment.

Figure 7:
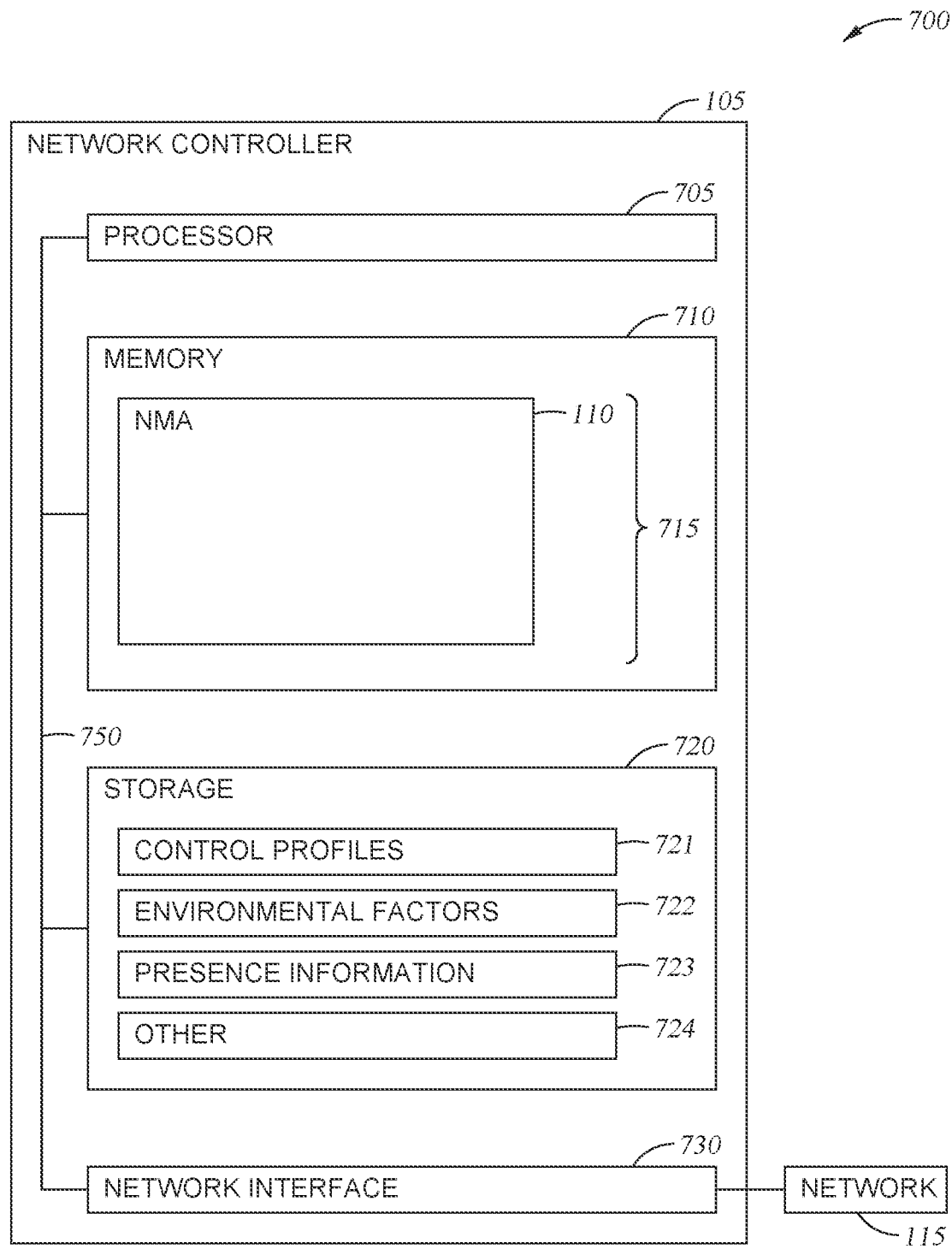
FIG. 7 illustrates is a block diagram of a network controller, according to one embodiment.

FIG. 7 illustrates is a block diagram of a network controller, according to one embodiment. The arrangement 700 includes the network controller 105, which perform the methods described herein at least in relation to FIGS. 1-6. The network controller 105 is shown in the form of a general-purpose computing device. In some examples, the network controller is a designated networking device in the networked system 100. For example, the network controller may be a designated network controller device, a switch, and/or an AP designated as the network controller. The components of network controller 105 may include, but are not limited to, one or more processing units or processors 705, a system memory 710, a storage system 720, network interface 730, and a bus 750 that couples various system components including the system memory 710 and storage system 720 to processors 705 along with the network interface 730. In other embodiments, the arrangement 700 is distributed and includes a plurality of discrete computing devices that are connected through wired or wireless networking.

The bus 750 represents one or more of any of several types of bus structures, including a memory bus or memory controller, a peripheral bus, an accelerated graphics port, and a processor or local bus using any of a variety of bus architectures. In some examples, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The network controller 105 typically includes a variety of computer system readable media. Such media may be any available media that is accessible by the network controller 105, and it includes both volatile and non-volatile media, removable and non-removable media.

System memory 710 can include computer system readable media in the form of volatile memory, such as random access memory (RAM) and/or cache memory. The network controller 105 may further include other removable/non-removable, volatile/non-volatile computer system storage media. In some examples, storage system 720 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 750 by one or more data media interfaces. As further depicted and described below, system memory 710 includes include at least one program product having a set (e.g., at least one) of program modules 715 that are configured to carry out the functions of embodiments of the network controller 105 and the NMA 110 described herein. The network controller 105 may further include other removable/non-removable volatile/non-volatile computer system storage media. In some examples, storage system 720 may be included as part of system memory 710 and may typically provide a non-volatile memory for the networked computing devices, and may include one or more different storage elements such as Flash memory, a hard disk drive, a solid state drive, an optical storage device, and/or a magnetic storage device. Storage system 720 may include media for storing data related to control profiles 721, environmental factors 722, presences information 723 and other information 724 used by the network controller 105. The information stored in storage system 720 may be updated and accessed by the program modules 715 described herein.

System memory 710 may also include a plurality of program modules 715 for performing various functions related the function of the network controller 105 such as the NMA 110. The program modules 715 generally include program code that is executable by one or more of the processors 705.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium, such as a non-transitory computer-readable medium, that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A non-transitory computer-readable medium comprising program instructions embodied therewith, the program instructions executable by a processor to perform an operation comprising:
    classifying, at a Network Monitoring Application (NMA), a first electronic device of a plurality of connected electronic devices into a first power control category of a plurality of power control categories, wherein classifying the first electronic device further comprises:
        detecting a local power control for the first electronic device;
        classifying the first electronic device as an autonomous decision device; and
        determining, from the local power control, a set of environmental factors for autonomous decision making at the first electronic device;

monitoring a physical environment associated with the plurality of connected electronic devices based on monitoring the set of environmental factors;

detecting a power control change in the physical environment; and transmitting a power control signal to the first electronic device comprising at least an indication of the detected power control change, wherein the power control signal comprises current values for the set of environmental factors.

2. The computer-readable medium of claim 1, wherein monitoring the physical environment further comprises:

receiving environmental information from the plurality of connected electronic devices;

detecting from the received environmental information a user presence status for the physical environment; and wherein detecting the power control change in the physical environment comprises:

detecting a change in the user presence status for the physical environment.

3. The computer-readable medium of claim 1, wherein monitoring the physical environment further comprises:

receiving environmental information from a presence system;

detecting from the received environmental information a user presence status for the physical environment; and wherein detecting the power control change in the physical environment comprises:

detecting a change in the user presence status for the physical environment.

4. The computer-readable medium of claim 1, further comprising:

associating a second power control category of a plurality of power control categories to the first power control category; and upon detecting the power control change in the physical environment transmitting a second power control signal to electronic devices in the second power control category.

5. The computer-readable medium of claim 1, wherein the power control signal comprises an information element (IE) in a Delivery Traffic Indication Map (DTIM) beacon with a tag-length-value (TLV) array, wherein the NMA sets each value in the TLV array based on the physical environment and the detected power control change.

6. The computer-readable medium of claim 1, wherein the power control signal comprises a unicast action frame; and wherein the computer-readable medium further comprises:

transmitting subsequent power control signals according to a transmission schedule.

7. A non-transitory computer-readable medium comprising program instructions embodied therewith, the program instructions executable by a processor to perform an operation comprising:

classifying, at a Network Monitoring Application (NMA), a first electronic device of a plurality of connected electronic devices into a first power control category of a plurality of power control categories, wherein classifying the first electronic device further comprises:

classifying the first electronic device as a centralized decision device; and generating a control profile for the first power control category, wherein the control profile comprises a set of environmental factors for central power control;

monitoring a physical environment associated with the plurality of connected electronic devices based on monitoring the set of environmental factors;

detecting a power control change in the physical environment; and transmitting a power control signal to the first electronic device comprising at least an indication of the detected power control change.

8. The computer-readable medium of claim 7, further comprising:

determining a set of power control actions comprising at least a wake action and a conserve action for the first electronic device;

upon detecting a power control change in the physical environment, selecting an action from the set of power control actions; and wherein the power control signal further comprises the selected action.

9. The computer-readable medium of claim 7, wherein monitoring the physical environment further comprises:

receiving environmental information from the plurality of connected electronic devices;

detecting from the received environmental information a user presence status for the physical environment; and wherein detecting the power control change in the physical environment comprises:

detecting a change in the user presence status for the physical environment.

10. The computer-readable medium of claim 7, wherein monitoring the physical environment further comprises:

receiving environmental information from a presence system;

detecting from the received environmental information a user presence status for the physical environment; and wherein detecting the power control change in the physical environment comprises:

detecting a change in the user presence status for the physical environment.

11. The computer-readable medium of claim 7, wherein the operation further comprises:

associating a second power control category of a plurality of power control categories to the first power control category; and upon detecting the power control change in the physical environment transmitting a second power control signal to electronic devices in the second power control category.

12. The computer-readable medium of claim 7, wherein the power control signal comprises an information element (IE) in a Delivery Traffic Indication Map (DTIM) with a tag-length-value (TLV) array, wherein the NMA sets each value in the TLV array based on the physical environment and the detected power control change.

13. The computer-readable medium of claim 7, wherein the power control signal comprises a unicast action frame; and wherein the operation further comprises:

transmitting subsequent power control signals according to a transmission schedule.

14. A non-transitory computer-readable medium program comprising program instructions embodied therewith, the program instructions executable by a processor to perform an operation comprising:

classifying, at a Network Monitoring Application (NMA), a first electronic device of a plurality of connected electronic devices into a first power control category of a plurality of power control categories;

monitoring a physical environment associated with the plurality of connected electronic devices based on environmental factors in the first power control category;

detecting a power control change in the physical environment; and transmitting a power control signal to the first electronic device comprising at least an indication of the detected power control change, wherein the power control signal comprises an information element (IE) in a Delivery Traffic Indication Map (DTIM) beacon with a tag-length-value (TLV) array, wherein the NMA sets each value in the TLV array based on the physical environment and the detected power control change.

15. The computer-readable medium of claim 14, wherein classifying the first electronic device further comprises:

detecting a local power control for the first electronic device;

classifying the first electronic device as an autonomous decision device or a centralized decision device;

when the first electronic device is an autonomous decision device:
  determining, from the local power control, a set of environmental factors for autonomous decision making at the first electronic device; and
  wherein monitoring the physical environment comprises monitoring the set of environmental factors; and
  wherein the power control signal comprises current values for the set of environmental factors;

when the first electronic device is a centralized decision device:
  classifying the first electronic device as centralized decision device;
  generating a control profile for the first power control category, wherein the control profile comprises a set of environmental factors for central power control; and
  wherein monitoring the physical environment comprises monitoring the set of environmental factors;
  determining a set of power control actions comprising at least a wake action and a conserve action for the first electronic device;
  upon detecting a power control change in the physical environment, selecting an action from the set of power control actions; and
  wherein the power control signal further comprises the selected action.

16. The computer-readable medium of claim 14, wherein the power control signal comprises a unicast action frame; and wherein the computer-readable medium further comprises:

transmitting subsequent power control signals according to a transmission schedule.

17. A non-transitory computer-readable medium comprising program instructions embodied therewith, the program instructions executable by a processor to perform an operation comprising:

classifying, at a Network Monitoring Application (NMA), a first electronic device of a plurality of connected electronic devices into a first power control category of a plurality of power control categories;

monitoring a physical environment associated with the plurality of connected electronic devices based on environmental factors in the first power control category;

detecting a power control change in the physical environment;

transmitting a power control signal to the first electronic device, the power control signal comprising an indication of the detected power control change and a unicast action frame; and transmitting subsequent power control signals according to a transmission schedule.

18. The computer-readable medium of claim 17, wherein classifying the first electronic device further comprises:

detecting a local power control for the first electronic device;

classifying the first electronic device as an autonomous decision device or a centralized decision device;

when the first electronic device is an autonomous decision device:
  determining, from the local power control, a set of environmental factors for autonomous decision making at the first electronic device; and
  wherein monitoring the physical environment comprises monitoring the set of environmental factors; and
  wherein the power control signal comprises current values for the set of environmental factors;

when the first electronic device is a centralized decision device:
  classifying the first electronic device as centralized decision device;
  generating a control profile for the first power control category, wherein the control profile comprises a set of environmental factors for central power control; and
  wherein monitoring the physical environment comprises monitoring the set of environmental factors;
  determining a set of power control actions comprising at least a wake action and a conserve action for the first electronic device;
  upon detecting a power control change in the physical environment, selecting an action from the set of power control actions; and
  wherein the power control signal further comprises the selected action.

19. The computer-readable medium of claim 17, further comprising:

associating a second power control category of a plurality of power control categories to the first power control category; and upon detecting the power control change in the physical environment transmitting a second power control signal to electronic devices in the second power control category.

20. The computer-readable medium of claim 17, wherein the power control signal comprises an information element (IE) in a Delivery Traffic Indication Map (DTIM) beacon with a tag-length-value (TLV) array, wherein the NMA sets each value in the TLV array based on the physical environment and the detected power control change.

* * * * *